United States Patent
Shimizu

(10) Patent No.: US 6,170,600 B1
(45) Date of Patent: *Jan. 9, 2001

(54) AUTOMATIC POWER STEERING SYSTEM

(75) Inventor: Yasuo Shimizu, Wako (JP)

(73) Assignee: Honda Giken Kogyo Kabushiki Kaisha, Tokyo (JP)

(*) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/911,452

(22) Filed: Aug. 14, 1997

(30) Foreign Application Priority Data

Sep. 5, 1996 (JP) .................................... 8-255571

(51) Int. Cl.$^7$ ........................................ B62D 5/04
(52) U.S. Cl. ............................................ 180/446; 701/41
(58) Field of Search ...................... 180/443, 446, 180/167, 168, 169; 701/41, 42

(56) References Cited

U.S. PATENT DOCUMENTS

| | | | |
|---|---|---|---|
| 4,361,202 | * 11/1982 | Minovitch | 180/168 |
| 4,837,690 | * 6/1989 | Morishita et al. | 364/424.05 |
| 5,159,553 | * 10/1992 | Karnopp et al. | 364/425.05 |
| 5,175,480 | * 12/1992 | McKeefery et al. | 318/587 |
| 5,236,335 | * 8/1993 | Takeuchi et al. | 180/446 |
| 5,257,828 | * 11/1993 | Miller et al. | 180/79.1 |
| 5,299,130 | * 3/1994 | Ono | 364/424.02 |
| 5,299,650 | * 4/1994 | Wada et al. | 180/79.1 |
| 5,318,143 | * 6/1994 | Parker et al. | 180/168 |
| 5,398,953 | * 3/1995 | Shimizu | 180/79.1 |
| 5,423,391 | * 6/1995 | Shimizu | 180/79.1 |
| 5,446,660 | * 8/1995 | Miichi et al. | 364/424.05 |
| 5,448,479 | * 9/1995 | Kemmer et al. | 364/424.02 |
| 5,504,679 | * 4/1996 | Wada et al. | 364/424.05 |
| 5,521,594 | * 5/1996 | Fukushima | 340/901 |
| 5,524,723 | * 6/1996 | Grambling et al. | 180/168 |
| 5,539,397 | * 7/1996 | Asanuma et al. | 340/901 |
| 5,661,650 | * 8/1997 | Sekine et al. | 701/41 |
| 5,742,240 | * 4/1998 | Asanuma et al. | 340/995 |
| 5,748,476 | * 5/1998 | Sekine et al. | 364/449 |
| 5,761,630 | * 6/1998 | Sekine et al. | 701/301 |
| 5,838,562 | * 11/1998 | Gudat et al. | 364/424.02 |
| 5,845,222 | * 12/1998 | Yamamoto et al. | 701/41 |
| 5,845,738 | * 12/1998 | Nishino et al. | 180/443 |
| 5,854,987 | * 12/1998 | Sekine et al. | 701/41 |
| 5,875,408 | * 2/1999 | Bendett et al. | 701/23 |

FOREIGN PATENT DOCUMENTS 7-205831  8/1995  (JP) .

* cited by examiner

Primary Examiner—Kevin Hurley
Assistant Examiner—Andrew J. Fischer
(74) Attorney, Agent, or Firm—Skjerven Morrill MacPherson LLP; Alan H. MacPherson; C. B. Allenby

(57) ABSTRACT

In an automatic power steering system incorporated with a power steering system and an automatic steering system, a continuous switching unit carries out a switch over between a power steering mode and an automatic steering mode in a continuous manner depending on the magnitude of the manual steering torque applied to the steering wheel. Thus, a smooth transition from one of the steering modes to the other can be accomplished without involving any absence of control.

30 Claims, 2 Drawing Sheets

AUTOMATIC POWER STEERING SYSTEM

TECHNICAL FIELD

The present invention relates to a vehicle steering system which combines a power steering system which assists the manual effort required by the vehicle operator to steer the vehicle and an automatic steering system which automatically steers the vehicle according to given road information.

BACKGROUND OF THE INVENTION

Various forms of automatic steering systems have recently been proposed which automatically steer the vehicle according to the configuration of the road. The road information can be derived from a GPS system incorporated with a map of the area, and/or from a television camera which may detect the position of a white line marked on the road or the shape of the road. It is also possible to use other guidance systems for guiding the vehicle along the road. According to such road information, a target value of a dynamic variable such as yaw rate, lateral acceleration, and steering angle is computed, and the vehicle steering system is controlled in such a manner that the deviation between the target value of the dynamic variable and the actual value of the dynamic variable is minimized.

It is now customary for a motor vehicle to be equipped with a power steering system which assists the manual steering input applied to a steering wheel by using a hydraulic cylinder or an electric motor. FIG. 3 shows a typical electric power steering system. A steering wheel 21 is attached to an upper end of a steering shaft 22, and a lower end of the steering shaft 22 is connected to a pinion 24 via a connecting shaft 23 which is provided with universal joints 23a and 23b at two ends thereof. The pinion 24 meshes with a rack 27 which extends laterally of the vehicle body and is guided to move along a longitudinal axial line thereof. The two ends of a rack shaft 28 carrying the rack 27 are connected to knuckle arms 26 of right and left front wheels W via tie rods 25. To provide a power assist to this steering system, an electric motor 29 is coaxially combined with the rack 27 for axially actuating the rack 27 via a ball and nut mechanism 30.

A steering torque sensor 31 is provided in an appropriate part of the steering system to detect the magnitude of the steering effort applied to the steering wheel 21 by the vehicle operator. The electric motor 29 is controlled by a controller 32 which receives an output signal from the steering torque sensor 31 so that a desired target steering torque may be produced.

The automatic steering system and the power steering system described above have various common components, and a significant reduction in size, cost, and complexity of the overall system can be achieved by sharing these common components by the two systems. The simplification of the overall system also contributes to an improvement in the reliability of the operation of these systems.

However, when these two systems are simply combined so as to share various component parts, certain inconveniences may arise. For instance, when both the automatic steering system and the power steering system are in operation, a manual effort to change the driving lane of the vehicle gives rise to an actual dynamic variable such as yaw rate, lateral acceleration, and steering angle which deviates from the target value of the dynamic variable, and the system tends to resist the manual effort.

To resolve such an inconvenience, it has been previously proposed in Japanese patent laid open publication No. 7-205831 to allow an automatic steering mode and a power steering mode to be selected in a mutually exclusive manner, and to provide a certain time lag in a switch-over between the two modes. However, according to this previous proposal, the time lag produces a blank period during which there is no steering control so that the transition from one mode to the other is not very smooth, and the vehicle operator may experience an undesirable sudden change in the handling of the vehicle.

BRIEF SUMMARY OF THE INVENTION

In view of such problems of the prior art, a primary object of the present invention is to provide an automatic power steering system which allows an automatic steering system and a power steering system to share various components so as to simplify the structure.

A second object of the present inventions to provide an automatic power steering system which allows a smooth transition from one of the operation modes to the other without involving any absence of control.

According to the present invention, these and other objects can be accomplished by providing a steering control system for a vehicle, comprising: a steering mechanism; power steering means for applying an assist steering torque to the steering mechanism according a magnitude of manual steering effort; automatic steering means for applying an automatic steering torque to the steering mechanism according to road information; continuous switching means for continuously changing weights of the assist steering torque and the automatic steering torque in an overall steering torque according to the magnitude of the manual steering effort. Typically, the manual steering effort is given by an output of a steering torque sensor for measuring a steering torque applied to a steering wheel.

Thus, it is possible to avoid any interference between a power steering mode and an automatic steering mode, and to switch over between them without any discontinuity.

According to a preferred embodiment of the present invention, the power steering means comprises steering torque detecting means for detecting a manual steering torque applied to a steering wheel, an actuator for producing the assist steering torque, and first target drive torque determining means for determining the assist steering torque according to a magnitude of the manual steering torque. Additionally, the automatic steering means may comprise road configuration detecting means for detecting a configuration of a road on which the vehicle is traveling, target dynamic variable determining means for determining a target dynamic variable for the vehicle according to an output from the road configuration detecting means, and second target drive torque determining means for determining the automatic steering torque which is to be produced by the actuator according an output from the target dynamic variable determining means. Also, the continuous switching means may comprise actual dynamic variable detecting means for measuring an actual value of the dynamic variable, estimated dynamic variable computing means for computing a hypothetical dynamic variable which would be produced when the output of the second target drive torque determining means is applied to the steering mechanism, and dynamic variable weighting means for weighting an output of the estimated dynamic variable computing means and an output of the actual dynamic variable detecting means according to an output of the steering torque detecting means, an output of the dynamic variable weighting means being deducted from the output of the target dynamic variable determining means which is applied to the second target drive torque determining means.

Thus, the continuous switching means can identify the point of switching of switching from one steering mode to the other in an unambiguous manner. Also, a significant part of sensors and actuators can be shared by the automatic steering system and the power steering system so that a significant reduction in cost and size can be achieved with the added advantage of an improvement in reliability. Also, the vehicle operator can regain the manual override of the steering system whenever necessary. Therefore, the vehicle operator can take sudden and extreme steering actions when such a need arises. Conversely, when the vehicle operator wishes to return to the automatic steering mode, all he is required to do is to let go of the steering wheel, and the steering system takes over the control in a highly smooth manner.

The dynamic variable which is given as a variable for representing the navigational movement of the vehicle may consist of a yaw rate, a lateral acceleration, a steering angle of a steerable wheel of the vehicle, or any combination of these variables. The road information can be obtained in any of a number of possible ways. For instance, the vehicle may be equipped with a GPS system incorporated with a road map. The road information required for the operation of the present invention may be produced from any guidance system which is capable of identifying the position of the vehicle with respect to the road on which the vehicle is traveling.

BRIEF DESCRIPTION OF THE DRAWINGS

Now the present invention is described in the following with reference to the appended drawings, in which.

DETAILED DESCRIPTION OF THE PREFERRED EMBODIMENTS

Figure 1:
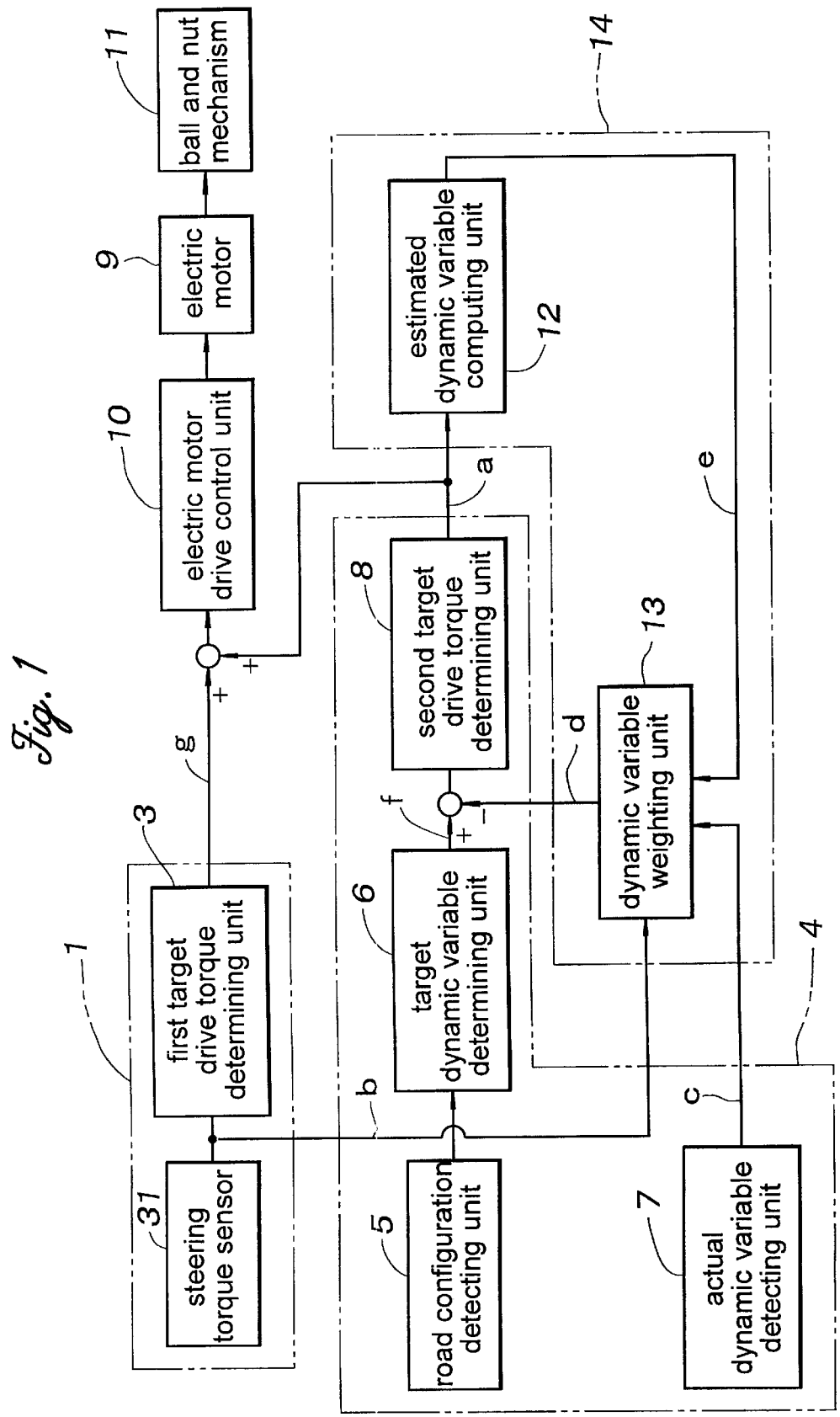
FIG. 1 is a block diagram of the control system for the automatic power steering system according to the present invention.
Figure 3:
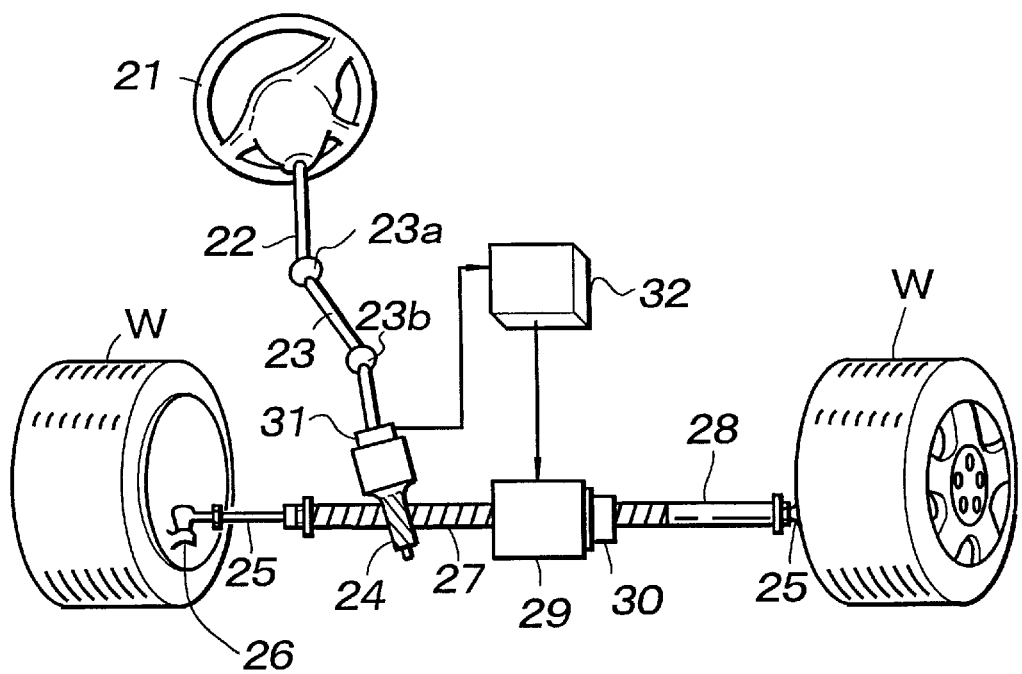
FIG. 3 is a steering system to which the present invention may be applied.

FIG. 1 generally illustrates the overall arrangement of the control system of an embodiment of the present invention. The mechanical arrangement of the steering system is not different from the conventional arrangement illustrated in FIG. 3, and reference should be made to FIG. 3 wherever appropriate.

An electric power steering control unit 1 includes a first target drive torque determining unit 3 which produces an appropriate assist steering torque target value for reducing the torque required to manually steer the vehicle according to an output from the steering torque sensor 31.

An automatic steering control unit 4 includes a road configuration detecting unit 5 for detecting the direction and the curvature of the road, on which the vehicle is traveling, according to map information stored in a GPS car navigation system, a target dynamic variable determining unit 6 for determining a target value of a dynamic variable such as yaw rate, lateral acceleration, or steering angle of the steerable wheels which is required for traveling the road, an actual dynamic variable detecting unit 7 for detecting the actual value of the dynamic variable of the vehicle, and a second target drive torque determining unit 8 for producing a target value of the steering torque which is required to follow the configuration of the road detected by the road configuration detecting unit 5.

The electric motor 9 is controlled by electric motor drive control unit 10 according to the sum of the output from the first drive torque determining unit 3 of the power steering control unit 1 and the second target drive torque determining unit 8 of the automatic steering control unit 4. The output torque of the electric motor 9 is converted into a thrust of the rack shaft 28 via a torque/thrust converting mechanism such as the ball and nut mechanism 11.

The electric power steering control unit 1 and the automatic steering control unit 4 are adapted to take over each other in a smooth manner by continuous switching unit 14 comprising an estimated dynamic variable computing unit 12 for estimating the dynamic variable of the vehicle motion according to an output a of the second target drive torque determining unit 8, and a dynamic variable weighting unit 13 for weighting an output e of the estimated dynamic variable computing unit 12 and an output c of the actual dynamic variable detecting unit 7 according to an output b of the steering torque sensor 31.

Now the operation of this system is described in the following.

The estimated dynamic variable computing unit 12 computes a value e of the estimated dynamic variable from the output a of the second target drive torque determining unit 8, and the estimated dynamic variable value e is given by a transfer function of a vehicle model in the following form.

$$e=[(\beta_n \cdot S^n + \beta_{n-1} \cdot S^{n-1} + \ldots + \beta_2 \cdot S^2 + \beta_1 \cdot S + \beta_0) / (\alpha_n \cdot S^n + \alpha_{n-1} \cdot S^{n-1} + \ldots + \alpha_2 \cdot S^2 + \alpha_1 \cdot S + \alpha_0)] \cdot a \quad (1)$$

For practical purpose, this transfer function may be approximated by a second order or a third order equation.

The output d of the state variable weighting unit 13 for weighting the output e of the estimated dynamic state variable computing unit 12 and the output c of the actual dynamic variable detecting unit 7 according to the output b of the steering torque sensor 31 can be given by the following equation.

$$d = c \cdot (1 - k(b)) + k(b) \cdot e \quad (2)$$

where $0 \leq k(b) \leq 1$

Here, k(b) is a function of the steering torque input which is given by the output b of the steering torque sensor 31. When the output b is small, or in the automatic steering mode where the vehicle operator is not applying any torque to the steering wheel 21, the weight of the output c of the actual dynamic variable detecting unit 7 is relatively large in the output d of the state variable weighting unit 13. Conversely, when the output b is large, or in the power steering mode where the vehicle operator is actively applying a manual torque to the steering wheel 21, the weight of the output e of the estimated state variable computing unit 12 is relatively large in the output d of the dynamic variable weighting unit 13. In this embodiment, the estimated dynamic variable computing unit 12 is represented by a transfer function of a vehicle model, but may also be represented by a state equation. Also, the dynamic variable weighting unit 13 may be represented by a membership function based on the fuzzy control theory.

Thus, in the automatic steering mode, because the vehicle operator does not apply any significant steering torque to the steering wheel 21, the output b of the steering torque sensor 31 is substantially zero, and so is the output g of the first target drive torque generating unit 3. Therefore, in this case, the electric motor control unit 10 receives the output a of the second target drive torque determining unit 8 which depends on the deviation between the output d of the dynamic variable weighting unit 13, in which the output c of the actual dynamic state variable detecting unit 7 is dominant and the output f of the target dynamic variable determining unit 6 which depends on the output of the road configuration detecting unit 5. As a result, the corresponding output of the electric motor 9 is applied to the manual steering unit via the torque/thrust converting mechanism 11 and the steering angle of the steerable wheels is controlled in such manner that the actual dynamic variable c and the target dynamic variable f are made to coincide with each other.

In the automatic steering mode, the output e of the estimated dynamic variable computing unit 12 substantially coincides with the output c of the actual dynamic variable detecting unit 7.

Figure 2:
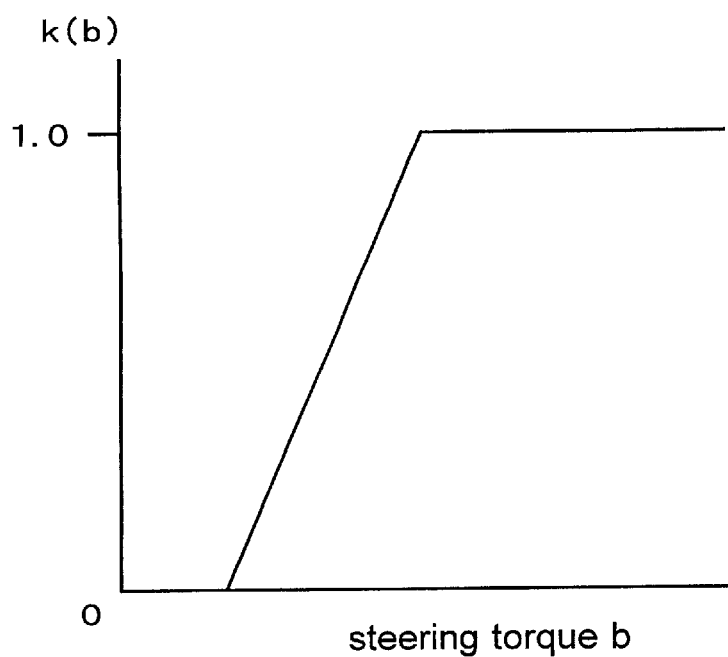
FIG. 2 is a weighting function for determining the relative weights of the power steering mode and the automatic steering mode.

When the steering wheel 21 is turned in this state, the output b of the steering torque sensor 31 increases, and the value of k(b) in FIG. 2 approaches 1 with the result that the weight of the output e of the estimated dynamic variable computing unit 12 in the output d of the dynamic variable weighting unit 13 becomes predominant. It means that a change in the output c of the actual dynamic variable detecting unit 7 would not cause any substantial increase in the deviation between the output d of the dynamic variable weighting unit 13 and the output f of the target dynamic variable determining unit 6. Thus, the output a of the second target drive torque determining unit 8 is reduced in magnitude, and the electric motor 9 is mostly actuated according to the output g of the first target drive torque determining unit 3. Any reduction in the manual steering torque applied to the steering wheel 21 is made up for by the increase in the weight of the output c of the actual dynamic variable detecting unit 7 in the output d of the dynamic variable weighting unit 13 so that a smooth transition to and from the automatic steering mode can be achieved.

The dynamic variable may consist of lateral acceleration, yaw rate, steering angle of the steerable wheels, or any combination of these variables. Obviously, the actual value, target value and estimated value are required to be similarly associated with each other without regard to any particular selection of the dynamic state variable.

The switching between the two steering modes was carried out according to the magnitude of the manual steering input to the steering wheel in the above described embodiment, but it is also possible to use other measures of steering effort such as steering speed, and steering acceleration in addition to or instead of the steering torque.

Although the present invention has been described in terms of a specific embodiment thereof, it is possible to modify and alter details thereof without departing from the spirit of the present invention.

What we claim is:

1. A steering control system for a vehicle, comprising:
    a steering mechanism;
    a power steering control unit coupled to said steering mechanism, wherein said power steering control unit applies an assist steering torque output to said steering mechanism according to a magnitude of a manual steering effort;
    an automatic steering control unit coupled to said steering mechanism, wherein said automatic steering control unit continuously adds an automatic steering torque output to said steering mechanism according to road information; and
    a continuous switching unit coupled to said power steering control unit and to said automatic steering control unit, wherein said continuous switching unit continuously changes, according to the magnitude of said manual steering effort, weights of said assist steering torque output and said automatic steering torque output in an overall steering torque output applied to said steering mechanism.

2. A steering control system according to claim 1, further comprising a steering torque sensor coupled to said steering mechanism, said sensor measuring said manual steering effort.

3. A steering control system according to claim 1, wherein said power steering control unit comprises:
    a steering torque detecting means for detecting a manual steering torque applied to a steering wheel;
    an actuator for producing said assist steering torque; and
    a first target drive torque determining unit, said first target drive torque determining unit determining said assist steering torque according to a magnitude of said manual steering torque.

4. A steering control system according to claim 3, wherein said automatic steering control unit comprises:
    a road configuration detecting unit detecting a configuration of a road on which the vehicle is traveling;
    a target dynamic variable determining unit coupled to said road configuration detecting unit, said target dynamic variable determining unit determining a target dynamic variable for the vehicle according to an output from said road configuration detecting unit; and
    a second target drive torque determining unit coupled to said target dynamic variable determining unit, said second target drive torque determining unit determining said automatic steering torque which is to be produced by said actuator according an output from said target dynamic variable determining unit.

5. A steering control system according to claim 4, wherein said continuous switching unit comprises:
    an actual dynamic variable detecting unit measuring an actual value of said dynamic variable;
    an estimated dynamic variable computing unit computing a hypothetical dynamic variable which would be produced when an output of said second target drive torque determining unit is applied to said steering mechanism; and
    a dynamic variable weighting unit coupled to said actual dynamic variable detecting unit and to said estimated dynamic variable computing unit, said dynamic variable weighting unit weighting an output of said estimated dynamic variable computing unit and an output of said actual dynamic variable detecting unit according to an output of said steering torque detecting means;
    wherein an output of said dynamic variable weighting unit is deducted from the output of said target dynamic variable determining unit to produce a difference output and said difference output is applied to said second target drive torque determining unit.

6. A steering control system according to claim 5, wherein said dynamic variable comprises a yaw rate of said vehicle.

7. A steering control system according to claim 5, wherein said dynamic variable comprises a lateral acceleration of said vehicle.

8. A steering control system according to claim 5, wherein said dynamic variable comprises a steering angle of a steerable wheel of said vehicle.

9. A steering control system for a vehicle comprising:
a steering mechanism;
a power steering control unit coupled to said steering mechanism, wherein said power steering control unit applies an assist steering torque output to said steering mechanism according to a magnitude of a manual steering effort;
an automatic steering control unit coupled to said steering mechanism and including a road configuration detecting unit, wherein said road configuration detecting unit detects a configuration of a road on which the vehicle is traveling, and wherein said automatic steering control unit continuously adds an automatic steering torque output to said steering mechanism according to road information; and
a continuous switching unit coupled to said power steering control unit and to said automatic steering control unit, wherein said continuous switching unit continuously changes, according to the magnitude of said manual steering effort, weights of said assist steering torque output and said automatic steering torque output in an overall steering torque output applied to said steering mechanism.

10. A steering control system according to claim 9, further comprising a steering torque sensor coupled to said steering mechanism, said sensor measuring said manual steering effort.

11. A steering control system according to claim 9, wherein said power steering control unit comprises:
a steering torque detecting unit for detecting a manual steering torque applied to a steering wheel;
an actuator for producing said assist steering torque; and
a first target drive torque determining unit, said first target drive torque determining unit determining said assist steering torque according to a magnitude of said manual steering torque.

12. A steering control system according to claim 11, wherein said automatic steering control unit further includes a target dynamic variable determining unit coupled to said road configuration detecting unit, said target dynamic variable determining unit determining a target dynamic variable for the vehicle according to an output from said road configuration detecting unit, and a second target drive torque determining unit coupled to said target dynamic variable determining unit, said second target drive torque determining unit determining said automatic steering torque which is to be produced by said actuator according an output from said target dynamic variable determining unit.

13. A steering control system according to claim 12, wherein said continuous switching unit comprises:
an actual dynamic variable detecting unit measuring an actual value of said dynamic variable;
an estimated dynamic variable computing unit computing a hypothetical dynamic variable which would be produced when an output of said second target drive torque determining unit is applied to said steering mechanism; and
a dynamic variable weighting unit coupled to said actual dynamic variable detecting unit and to said estimated dynamic variable computing unit, said dynamic variable weighting unit weighting an output of said estimated dynamic variable computing unit and an output of said actual dynamic variable detecting unit according to an output of said steering torque detecting unit, wherein an output of said dynamic variable weighting unit is deducted from the output of said target dynamic variable determining unit and applied to said second target drive torque determining unit.

14. A steering control system according to claim 13, wherein said dynamic variable comprises a yaw rate of said vehicle.

15. A steering control system according to claim 13, wherein said dynamic variable comprises a lateral acceleration of said vehicle.

16. A steering control system according to claim 13, wherein said dynamic variable comprises a steering angle of a steerable wheel of said vehicle.

17. A vehicle steering control system comprising:
a vehicle steering mechanism;
a power steering control unit coupled to the steering mechanism;
an automatic steering control unit coupled to the steering mechanism;
a continuous switching unit coupled to the automatic steering control unit; and
a dynamic variable weighted output that is output from the continuous switching unit to the automatic steering control unit, wherein the weighted output includes a first output associated with a detected value of a dynamic variable of the vehicle and a second output associated with an estimated value of the dynamic variable, and wherein the weights of the first and second outputs in the weighted output are continuously varied according to a magnitude of a manual steering effort.

18. The system of claim 17, wherein the dynamic variable comprises a yaw rate of the vehicle.

19. The system of claim 17, wherein the dynamic variable comprises a lateral acceleration of the vehicle.

20. The system of claim 17, wherein the dynamic variable comprises a steering angle of a steerable wheel of the vehicle.

21. The system of claim 17, wherein the power steering control unit comprises:
a first target drive torque determining unit coupled to the steering mechanism;
a steering torque sensor coupled to the first target drive torque determining unit and to the continuous switching unit;
a first target drive torque output that is output from the first target drive torque determining unit to the steering mechanism; and
a steering torque output associated with the magnitude of the manual steering effort, wherein the steering torque output is output from the steering torque sensor to the first target drive torque determining unit and to the continuous switching unit.

22. The system of claim 17, wherein the automatic steering control unit comprises:
a second target drive torque determining unit coupled to the steering mechanism;
a second target drive torque output that is output from the second drive torque determining unit to the steering mechanism;
a target dynamic variable determining unit coupled to the second target drive torque determining unit;
a target dynamic variable output that is output to the second target drive torque determining unit; and
a road configuration detecting unit coupled to the target dynamic variable determining unit.

23. The system of claim 17, wherein the continuous switching unit comprises:

a dynamic variable weighting unit coupled to the automatic steering control system, wherein the dynamic variable weighting unit outputs the dynamic variable weighted output to the automatic steering control system;

an actual dynamic variable detecting unit coupled to the dynamic variable weighting unit, wherein the actual dynamic variable detecting unit outputs the first output to the dynamic variable weighting unit; and an estimated dynamic variable computing unit coupled to the dynamic variable weighting unit, wherein the estimated dynamic variable computing unit outputs the second output to the dynamic variable weighting unit.

24. The system of claim 17 further comprising:

a second target drive torque determining unit coupled to the steering mechanism;

a dynamic variable weighting unit coupled to the second target drive torque determining unit, wherein the dynamic variable weighting unit outputs the dynamic variable weighted output to the second target drive torque determining unit;

an actual dynamic variable detecting unit coupled to the dynamic variable weighting unit, wherein the actual dynamic variable detecting unit outputs the first output to the dynamic variable weighting unit; and an estimated dynamic variable computing unit coupled to the dynamic variable weighting unit and to the second target drive torque determining unit, wherein the estimated dynamic variable computing unit outputs the second output to the dynamic variable weighting unit; and a second target drive torque output that is output from the second drive torque determining unit to the steering mechanism and to the estimated dynamic variable computing unit.

25. The system of claim 24 further comprising:

a target dynamic variable determining unit coupled to the second target drive torque determining unit;

a target dynamic variable output that is output to the second target drive torque determining unit; and a road configuration detecting unit coupled to the target dynamic variable determining unit.

26. The system of claim 25, wherein the road configuration detecting unit comprises a global positioning system (GPS) car navigation system and map information stored in the GPS system.

27. The system of claim 25 wherein the dynamic variable weighted output is deducted from the target dynamic variable output.

28. The system of claim 27, wherein the dynamic variable comprises a yaw rate of the vehicle.

29. The system of claim 27, wherein the dynamic variable comprises a lateral acceleration of the vehicle.

30. The system of claim 27, wherein the dynamic variable comprises a steering angle of a steerable wheel of the vehicle.

* * * * *